(12) United States Patent
Kim et al.

(10) Patent No.: US 11,595,263 B1
(45) Date of Patent: Feb. 28, 2023

(54) DYNAMIC CONSTRUCTION OF VIRTUAL DEDICATED NETWORK SLICE BASED ON SOFTWARE-DEFINED NETWORK

(71) Applicants: KOREA INSTITUTE OF SCIENCE & TECHNOLOGY INFORMATION, Daejeon (KR); TRENTO SYSTEMS.INC., Daejeon (KR)

(72) Inventors: Young Jae Kim, Daejeon (KR); Dong Kyun Kim, Daejeon (KR)

(73) Assignees: TRENTO SYSTEMS, INC., Daejeon (KR); KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 0 days.

(21) Appl. No.: 17/732,983

(22) Filed: Apr. 29, 2022

Related U.S. Application Data

(63) Continuation of application No. PCT/KR2021/017658, filed on Nov. 26, 2021.

(30) Foreign Application Priority Data

Aug. 27, 2021 (KR) .......................... 10-2021-0114013

(51) Int. Cl.
| | | |
|---|---|---|
| G06F 15/173 | (2006.01) |
| H04L 41/0895 | (2022.01) |
| H04L 41/0896 | (2022.01) |
| H04L 45/64 | (2022.01) |
| H04L 41/40 | (2022.01) |

(52) U.S. Cl.
CPC ...... *H04L 41/0895* (2022.05); *H04L 41/0896* (2013.01); *H04L 41/40* (2022.05); *H04L 45/64* (2013.01)

(58) Field of Classification Search
CPC ...... H04L 41/12; H04L 41/40; H04L 41/0895
USPC ........................................................... 709/224
See application file for complete search history.

(56) References Cited

U.S. PATENT DOCUMENTS

| | | | |
|---|---|---|---|
| 11,310,733 B1* | 4/2022 | Gupta ............... | H04W 28/0268 |
| 2015/0256414 A1* | 9/2015 | Koide ................ | H04L 41/0806 |
| | | | 715/735 |
| 2017/0054595 A1* | 2/2017 | Zhang ................ | H04L 41/0896 |
| 2019/0372853 A1* | 12/2019 | Bainbridge ........... | H04L 49/354 |
| 2020/0221346 A1* | 7/2020 | Park ...................... | H04W 28/24 |
| 2021/0306235 A1* | 9/2021 | Al-Dulaimi ............ | H04L 41/12 |
| 2022/0232423 A1* | 7/2022 | Thyagaturu .......... | H04W 28/08 |

FOREIGN PATENT DOCUMENTS

| | | |
|---|---|---|
| JP | 2015195479 A | 11/2015 |
| KR | 10-1754618 B1 | 7/2017 |
| KR | 10-2053596 B1 | 12/2019 |
| KR | 10-2020-0073996 A | 6/2020 |
| KR | 10-2021-0024649 A | 3/2021 |

\* cited by examiner

*Primary Examiner* — Hee Soo Kim

(74) *Attorney, Agent, or Firm* — Fenwick & West LLP

(57) ABSTRACT

Disclosed are a network control device and an operation method of the network control device for dynamically constructing an end-to-end virtual dedicated network slice based on a software-defined network (SDN) over the entire wired and wireless network section of a private network and a public network.

8 Claims, 9 Drawing Sheets

FIG. 8A
FIG. 8B
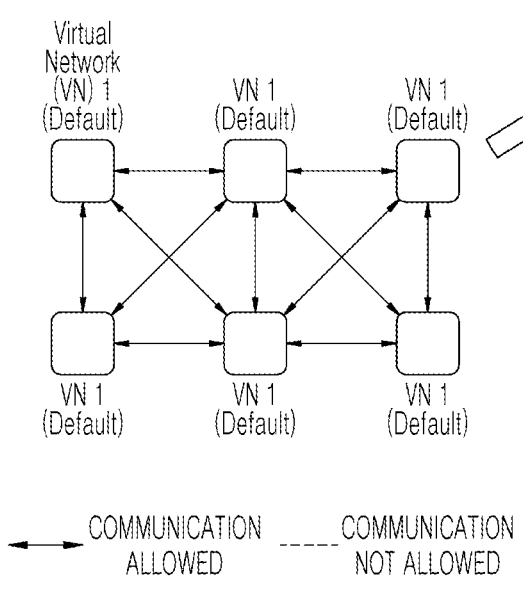
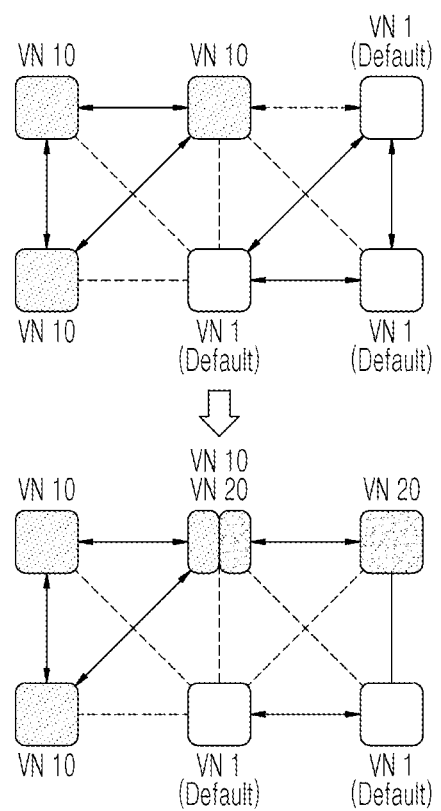

DYNAMIC CONSTRUCTION OF VIRTUAL DEDICATED NETWORK SLICE BASED ON SOFTWARE-DEFINED NETWORK

CROSS-REFERENCE TO RELATED APPLICATIONS

This application is a bypass continuation application of International PCT application no. PCT/KR2021/017658, filed on Nov. 26, 2021, which claims priority to Republic of Korea Patent Application No. 10-2021-0114013, filed on Aug. 27, 2021, which are incorporated by reference herein in their entirety.

TECHNICAL FIELD

The present invention relates to a method for dynamically constructing an end-to-end virtual dedicated network slice based on a software-defined network (SDN) over the entire wired and wireless network section of a private network and a public network.

BACKGROUND ART

A 4G network is a network that uses the same network for all services and determines and interferes with a transmission path for each node, and thus cannot implement an ultra-high-speed and low-latency network. On the other hand, a 5G network is centralized based on an SDN, and thus may implement an ultra-high-speed and low-latency network by shortening a processing time for determining a transmission path of nodes.

Meanwhile, as 5G technology spreads to various industries, construction of private 5G networks such as smart factories and smart offices is accelerating in recent years. However, the current private 5G network system does not deviate from the form of the existing public network despite having advantages of openness, which is a characteristic of the 5G network based on the SDN, and overcoming dependency on a network device vendor. In other words, there is a limit to spread of the private 5G networks due to a complicated configuration, cost, and difficulty of operation resulting from construction of a public network-based system.

SUMMARY

Therefore, the present invention has been made in view of the above problems, and it is an object of the present invention to dynamically build an SDN-based end-to-end virtual dedicated network slice across the entire wired and wireless network of a private network and a public network.

In accordance with an aspect of the present invention, the above and other objects can be accomplished by the provision of a network control device including a generation unit configured to generate a dedicated network tree, the dedicated network tree being a physical path through which a packet is allowed to be forwarded in an SDN-based virtual dedicated network slice relative to a host belonging to the virtual dedicated network slice when construction of the virtual dedicated network slice is required, and a determination unit configured to determine an OpenFlow rule indicating a packet forwarding path based on the dedicated network tree when a packet is generated between hosts belonging to the virtual dedicated network slice, and allow a packet to be forwarded according to the OpenFlow rule.

The dedicated network tree may include a wired subnetwork constructed for a core network section of the virtual dedicated network slice and a radio subnetwork constructed for a radio access network section of the virtual dedicated network slice.

When there is an effective node having an available link, which is a wired link not occupied by another virtual dedicated network slice, having a bandwidth equal to or greater than a reference bandwidth required by the virtual dedicated network slice among nodes to which packets are forwarded in the core network section, the generation unit may construct the wired subnetwork based on the effective node and the available link of the effective node.

When the number of available links of the effective node is two or more, the generation unit may exclude a remaining available link except for an available link having a minimum bandwidth among the two or more available links from the wired subnetwork.

When there is an effective radio access device having an available channel, which is a radio channel not occupied by another virtual dedicated network slice, having a bandwidth greater than or equal to a reference bandwidth required by the virtual dedicated network slice among radio access points in the radio access network section, the generation unit may construct the radio service network based on the effective radio access point and the available channel of the effective radio access point.

When the number of available channels of the effective radio access point is two or more, the generation unit may exclude a remaining available channel except for an available channel having a minimum bandwidth among the two or more available channels from the radio subnetwork.

When the effective radio access device is not present, the generation unit may construct the radio subnetwork based on an available radio access device, an occupied channel of which occupied by the other virtual dedicated network slice has a residual bandwidth equal to or greater than the reference bandwidth, and the occupied channel of the available radio access device.

The dedicated network tree may include a base station located at a boundary between the core network section and the radio access network section, and the base station may include an OpenFlow digital network unit serving as an OpenFlow switch dedicated to a radio access network in the core network section, and two or more open radio access points which are radio access points accessed by a terminal in the radio access network section and connected to the OpenFlow digital network unit by Ethernet protocol.

In accordance with another aspect of the present invention, there is provided an operation method of a network control device, the operation method including a generation step of generating a dedicated network tree, the dedicated network tree being a physical path through which a packet is allowed to be forwarded in an SDN-based virtual dedicated network slice relative to a host belonging to the virtual dedicated network slice when construction of the virtual dedicated network slice is required, and a determination step of determining an OpenFlow rule indicating a packet forwarding path based on the dedicated network tree when a packet is generated between hosts belonging to the virtual dedicated network slice, and allowing a packet to be forwarded according to the OpenFlow rule.

The dedicated network tree may include a wired subnetwork constructed for a core network section of the virtual dedicated network slice and a radio subnetwork constructed for a radio access network section of the virtual dedicated network slice.

When there is an effective node having an available link, which is a wired link not occupied by another virtual dedicated network slice, having a bandwidth equal to or greater than a reference bandwidth required by the virtual dedicated network slice among nodes to which packets are forwarded in the core network section, the generation step may include constructing the wired subnetwork based on the effective node and the available link of the effective node.

When there is an effective radio access device having an available channel, which is a radio channel not occupied by another virtual dedicated network slice, having a bandwidth greater than or equal to a reference bandwidth required by the virtual dedicated network slice among radio access points in the radio access network section, the generation step may include constructing the radio service network based on the effective radio access point and the available channel of the effective radio access point.

As described above, according to the network control device and the operation method of the network control device of the present invention, it is possible to construct an end-to-end virtual dedicated network slice over the entire wired and wireless network section by applying the SDN-based OpenFlow technology, which may greatly contribute to propagation of private 5G networks. In addition, with the application of OpenFlow technology, complete isolation is enabled for each virtual dedicated network slice. In this way, it is possible to ensure security and ultra-low latency. Additionally, since network resources may be efficiently operated without adding resources, it is possible to achieve reduction in cost due to network operation.

BRIEF DESCRIPTION OF DRAWINGS

FIGS. 8A and 8B are an illustrative diagram for describing a packet forwarding form according to an embodiment of the present invention.

DETAILED DESCRIPTION OF THE INVENTION

Hereinafter, preferred embodiments of the present invention will be described with reference to the accompanying drawings.

In an embodiment of the present invention, SDN-based OpenFlow technology is employed.

Meanwhile, as 5G technology spreads to various industries, construction of private 5G networks such as smart factories and smart offices is accelerating in recent years.

However, the current private 5G network system does not deviate from the form of the existing public network despite having advantages of openness, which is a characteristic of the 5G network based on the SDN, and overcoming dependency on a network device vendor.

In other words, there is a limit to spread of private 5G networks due to a complicated configuration, cost, and difficulty of operation resulting from construction of a public network-based system.

Accordingly, in an embodiment of the present invention, it is intended to propose a new method for dynamically constructing a virtual dedicated network slice based on an SDN over the entire wired and wireless network section of a private network and a public network.

Figure 1:
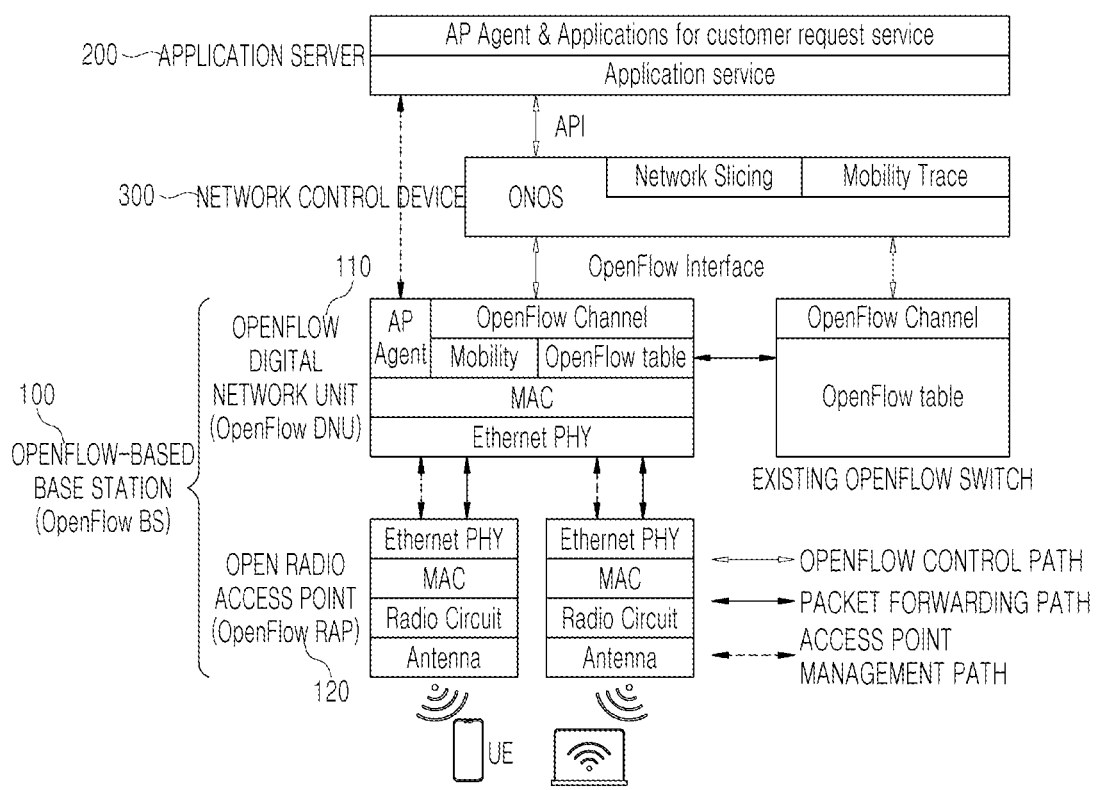
FIG. 1 is an illustrative diagram of an SDN-based network slicing platform environment according to an embodiment of the present invention.

In this regard, FIG. 1 illustrates an SDN-based network slicing platform environment according to an embodiment of the present invention.

As illustrated in FIG. 1, the network slicing platform environment according to the embodiment of the present invention may include a base station 100 wirelessly accessed by a user terminal (UE), and a network control device 300 that constructs a virtual dedicated network slice in association with an application server 200.

Meanwhile, after 5G, a core network is rapidly converted into an SDN-based intelligent network, and for application of network slicing, which is an essential service of 5G a device using the existing unlicensed frequency band needs to be separated into a control plane (CP) and a user data plane (UP), and needs to be converted into a structure to ensure fast mobility.

Accordingly, the base station 100 according to the embodiment of the present invention has a characteristic of being divided into devices for each functional unit including an OpenFlow digital network unit 110 serving as an OpenFlow switch dedicated to a radio access network in a core network section (national office), and an open radio access point 120 connected to the UE by multiple radio links in a radio access network section.

A plurality of OpenFlow digital network units 110 is concentrated and installed in the form of a cloud in the core network section (national office), and a plurality of open radio access points 120 is connected to one OpenFlow digital network unit 110 by Ethernet protocol.

Figure 2:
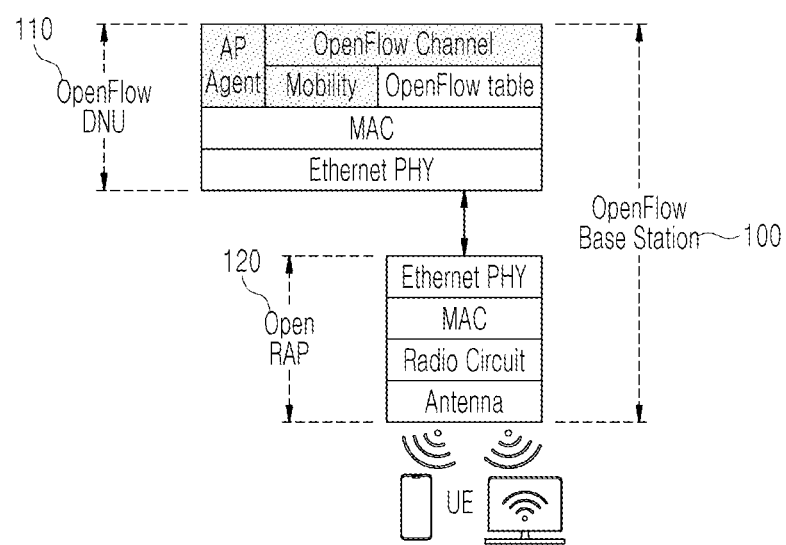
FIG. 2 is an illustrative diagram for describing a separation structure of a base station according to an embodiment of the present invention.

In particular, in order to overcome the limitations of interworking with a radio device and mobility control possessed by the existing OpenFlow switch, for example, as illustrated in FIG. 2, the OpenFlow digital network unit 110 includes the CP having "OpenFlow Channel" for a control interface with the network control device 300, "Mobility" for supporting high-speed handoff by detecting mobility, and "AP Agent" for control and management of the open radio access point and the UP having "OpenFlow table" for data transmission and "Ethernet PHY" for connection and data transmission of the open radio access point 120.

In this regard, since network functions, which are the existing L3 or higher layer functions, are concentrated in the OpenFlow digital network unit 110, the open radio access point 120 only includes "Ethernet PHY" for connection with the OpenFlow digital network unit 110 and "Radio Circuit" for data transmission.

As such, the base station 100 according to the embodiment of the present invention facilitates dealing with failure and upgrading since network functions are concentrated in the OpenFlow digital network unit 110 and installed in the core network section (national office), may implement a network slicing service for the open radio access point 120 as control of the open radio access point 120 becomes possible, and may support high-speed handoff in an L2-layer since movement of a terminal (MAC address) connected to the open radio access point 120 may be automatically detected.

In addition, since the open radio access point 120 has a device structure that is simpler than before in terms of both hardware and software, the probability of failure is reduced, maintenance costs are reduced, and it is possible to escape from dependency on hardware device manufacturers.

The application server 200 refers to a server that virtualizes and provides a network function required by the network control device 300 in the form of an application. For example, it is possible to provide an application for dynamic construction (generation, update, and deletion) of a dedicated network slice, an application for mobility management (tracking and control), an application for management and a network function virtualization service of the open radio access point 120, etc.

The network control device 300 refers to a device in charge of control of construction of the virtual dedicated network slice, forwarding of a packet for each virtual dedicated network slice, mobility management, etc. over the entire wired and wireless network section through the above-described application-based network function provided by the application server 200.

In the SDN-based network slicing platform environment according to the embodiment of the present invention, the SDN-based virtual dedicated network slice may be dynamically constructed and operated over the entire wired and wireless network section of the private network and the public network through the above-described configuration. Hereinafter, a configuration of the network control device 300 for implementation thereof will be described in more detail.

Figure 3:
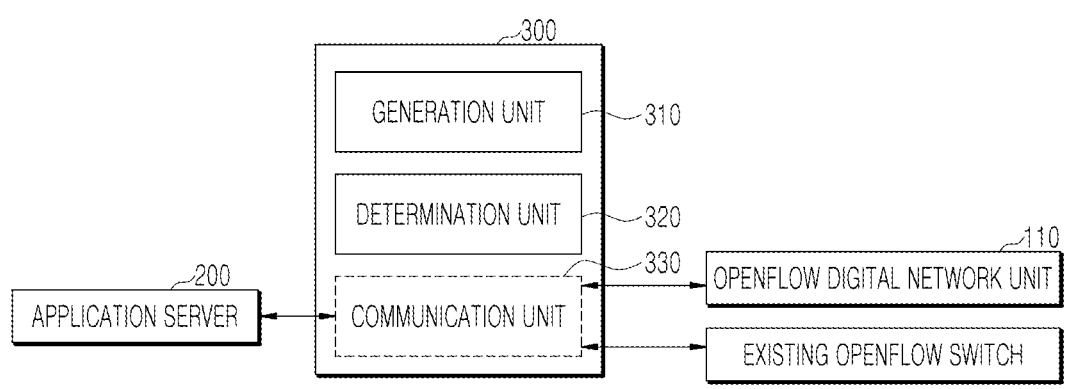
FIG. 3 is a schematic configuration diagram of a network control device according to an embodiment of the present invention.

FIG. 3 illustrates a schematic configuration of the network control device 300 according to an embodiment of the present invention.

As illustrated in FIG. 3, the network control device 300 according to the embodiment of the present invention may include a generation unit 310 for generating a dedicated network tree and a determination unit 320 for determining an OpenFlow rule for packet forwarding.

The entire configuration or at least a part of the configuration of the network control device 300 may be implemented in the form of a hardware module or a software module, or may be implemented in the form in which a hardware module and a software module are combined.

Here, the software module may be understood as, for example, a command executed by a processor that processes an operation in the network control device 300, and such a command may be loaded in a separate memory in the network control device 300.

Meanwhile, in addition to the above-described configuration, the network control device 100 according to the embodiment of the present invention may have a configuration further including a communication unit 330 in charge of a communication function of the OpenFlow digital network unit 110 of the base station 100 included in the dedicated network tree with the existing OpenFlow switch and the application server 200.

As described above, the network control device 300 according to the embodiment of the present invention may dynamically construct and operate the SDN-based virtual dedicated network slice over the entire wired and wireless network section of the private network and the public network through the above-described configuration. Hereinafter, a more detailed description of each configuration in the network control device 300 for implementation thereof will be given.

The generation unit 310 performs a function of generating a dedicated network tree.

More specifically, when construction of the SDN-based virtual dedicated network slice is required, the generation unit 310 generates a dedicated network tree that is a physical path through which a packet may be forwarded in the virtual dedicated network slice relative to a host belonging to the virtual dedicated network slice.

In this regard, for generation of the dedicated network tree, it is possible to refer to the entire physical network topology, an identifier of the UE participating in the dedicated network slice, a reference bandwidth required by the dedicated network slice, resource information for the open radio access point 120 connected to the OpenFlow digital network unit 110, etc., and such information may be obtained through the application server 200.

In this instance, the generation unit 310 generates the dedicated network tree by dividing the core network section and the radio access network section of the virtual dedicated network slice.

In other words, the generation unit 310 may complete generation of the dedicated network tree by constructing a wired subnetwork for the core network section of the virtual dedicated network slice and then constructing a radio subnetwork for the radio access network section.

First, when there is an effective node having an available link, which is a wired link not occupied by another virtual dedicated network slice, having a bandwidth equal to or greater than a reference bandwidth required by the virtual dedicated network slice among nodes to which packets are forwarded in the core network section, the generation unit 310 may construct the wired subnetwork based on such an effective node and the available link of the effective node.

For reference, the nodes reflected in the wired subnetwork construction as described above may be understood as a host to which a destination address or a source address may be assigned in the core network section, the OpenFlow digital network unit 110 of the base station 100, and the existing OpenFlow switch.

Figure 4:
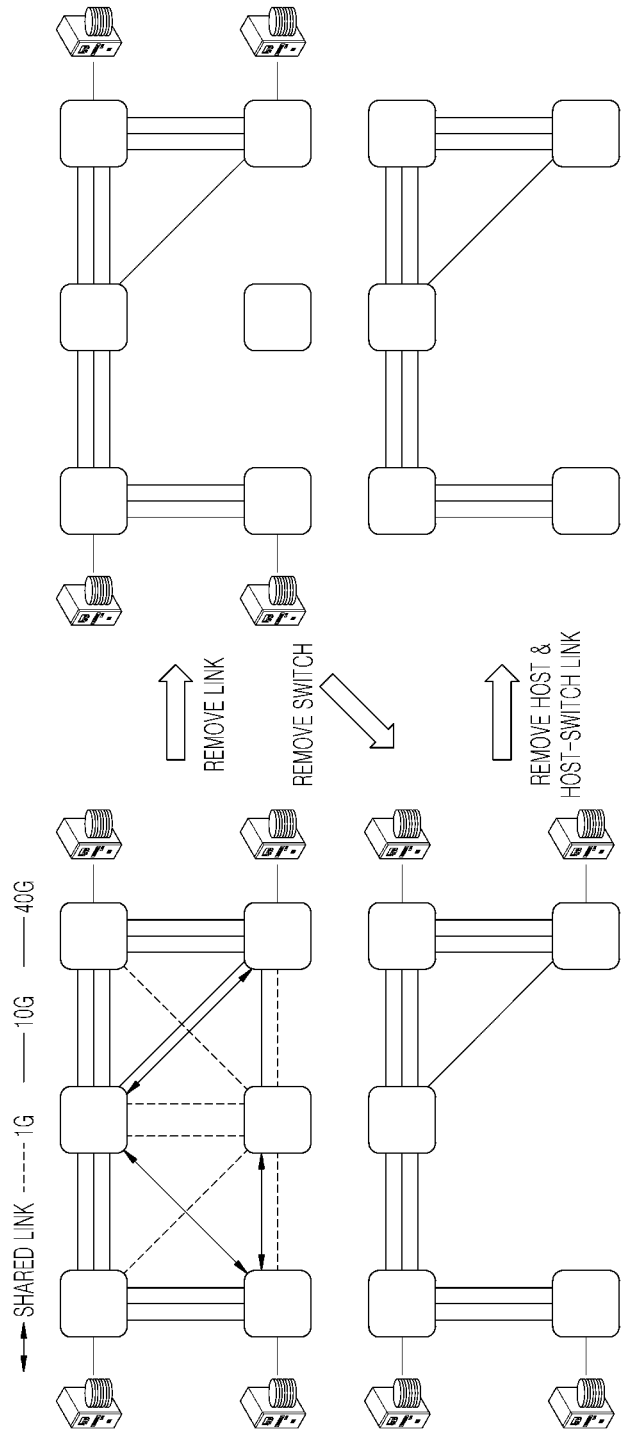
FIGS. 4 and 5 are illustrative diagrams for describing a wired subnetwork construction process according to an embodiment of the present invention.

In this regard, FIG. 4 illustrates a process of constructing such a wired subnetwork.

Referring to FIG. 4, a physical network in the core network section may be expressed in the form of "G(V, E)" in which a node to which the packet is forwarded is named "V", and a wired link of this node "V" is named "E".

A link having a resource having a bandwidth less than or equal to a reference bandwidth required by the virtual dedicated network slice and a link already occupied by another virtual dedicated network slice are excluded from "G(V, E)" for tree construction.

In this instance, an OpenFlow switch not having one or more available links is unnecessary, and thus is excluded from the wired subnetwork.

Meanwhile, since the host is not included in a packet transmission path between hosts, all the hosts and links between the hosts and the access OpenFlow switches are excluded from G(V, E).

However, by including access OpenFlow switches of hosts participating in the virtual dedicated network slice in the tree, packet transmission between the hosts participating in the virtual dedicated network slice is ensured.

That is, a wired subnetwork for reducing the temporal complexity of generating the dedicated network tree may be constructed in the form of "G'(V', E')".

Here, "V'" refers to an effective node that is a node having one or more available links, and "E'" refers to an available link possessed by the effective node.

However, for example, when the access OpenFlow switch of the participating host cannot be included in "V'" at the time of construction of the virtual dedicated network slice that requires a reference bandwidth of 10G, it is fundamentally impossible to ensure the reference bandwidth for the host, and thus it is desirable to immediately terminate the construction of the virtual dedicated network slice and perform a procedure related to failure.

Meanwhile, in an actual physical network, a link between OpenFlow switches is configured as multiple links having various bandwidths.

However, in order to improve a generation speed of the dedicated network tree, it is necessary to allocate and use only one link that satisfies the reference bandwidth between arbitrary OpenFlow switches on the virtual dedicated network slice.

In this regard, the physical network topology including multiple links may be abstracted into a single link to simplify the network topology, thereby improving the tree generation speed.

In this instance, a single link is selected from the multiple links by leaving only one available link having the minimum bandwidth among remaining available links between arbitrary OpenFlow switches in the wired subnetwork "G'(V', E')", and by excluding remaining available links from the wired subnetwork.

Figure 5:
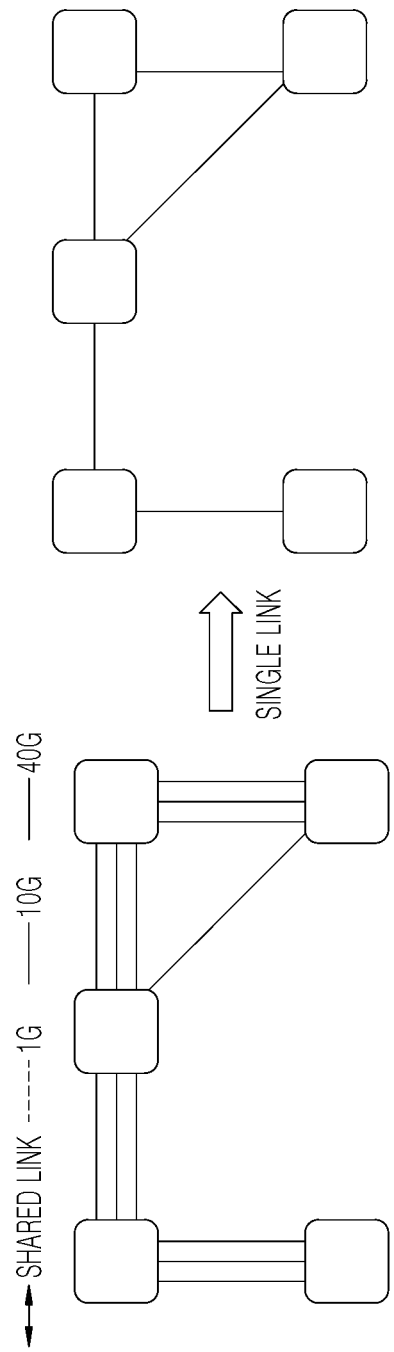

For reference, a unification process of such multiple links may be schematically illustrated in the form illustrated in FIG. 5.

Upon completing construction of the wired subnetwork, when there is an effective radio access device having an available channel, which is a radio channel not occupied by another virtual dedicated network slice, having a bandwidth greater than or equal to the reference bandwidth required by the virtual dedicated network slice among the open radio access points 120 in the radio access network section, the generation unit 310 may construct a radio service network based on such an effective radio access point and the available channel of the effective radio access point.

However, when there is no effective radio access device having an available channel, the generation unit 310 may construct the radio subnetwork based on an available radio access device, an occupied channel of which occupied by another virtual dedicated network slice has a residual bandwidth equal to or greater than the reference bandwidth, and the occupied channel of the available radio access device.

For example, when a link L having 40G is occupied by another virtual dedicated network slice referred to as A, which requires 10G, since there is a residual bandwidth of 30G, the corresponding link may be included in the radio subnetwork to generate a tree of a new virtual dedicated network slice that requires a bandwidth less than or equal to the bandwidth.

However, when a link is shared in this way, it is necessary to set a little guard band in order to avoid interference between virtual dedicated network slices.

Meanwhile, the bandwidth of the radio service network is equal to or greater than the reference bandwidth to construct the virtual dedicated network slice over the entire wired and wireless network section, and needs to be determined equal to or smaller than that of the wired subnetwork, which may be expressed as the following [Formula 1].

$$\text{Reference bandwidth } B_U \leq \text{radio subnetwork bandwidth } B_R \leq \text{wired subnetwork bandwidth } B_N \quad \text{[Formula 1]}$$

In addition, when the bandwidth $B_R$ of the radio subnetwork is determined in this way, it is necessary to find a base station or a channel (cell) that may ensure a maximum transmission service rate (reference bandwidth) requested by a customer using a current resource and allocate the resource.

In this regard, variables of the base station 100 end that may be reflected in construction of the radio subnetwork are as follows.

Channel bandwidth $B_C$—A bandwidth of a channel that may be serviced by a radio access device of the base station, which may be variously adjusted from several kHz to several hundred MHz according to a service request and provided.

Number of data subcarriers $C_N$—The number of subcarriers that transmit modulated data in the channel bandwidth $B_C$.

Number of spatial streams $S_N$—The number of unique MIMO data streams that may be transmitted in parallel from a radio base station. A transmission rate of a serviced device increases in proportion to the number of streams.

Number of modulation bits $M_N$—The number of bits that may be transmitted at one time by each data subcarrier according to a predefined modulation scheme, which is selectively determined by a system according to the S/N characteristic.

Coding rate $C_R$—The system determines in advance useful data in modulated data and the number of error correction bits for error correction according to the S/N characteristic.

Symbol interval time $T_G$—The sum of the modulated OFDM data interval time (OFDM Symbol Duration)+the guard interval (Guard Interval Duration), which is a value determined in advance when the system is initially set and is defined as a constant.

In addition, in this regard, equations for resource search and allocation for construction of the radio subnetwork at the base station 100 end may be proposed as follows.

In this case, an LOS environment is assumed as a radio environment, and wireless transmission schemes using an OFDM scheme are equally applied.

First, when the radio subnetwork is constructed using a resource of a base station providing the virtual dedicated network slice, a maximum speed that may be ensured is as shown in [Formula 2] to [Formula 5].

$$\text{Operator control variable:} \alpha = C_N * S_N \quad \text{[Formula 2]}$$

Here, the operator control variable "α" is the maximum number of bits that may be transmitted by the base station at one time, and is a variable that may be adjusted by the operator according to the reference bandwidth in consideration of an available bandwidth of a base station and availability of the number of spatial streams of an antenna.

$$\text{Operator control variable:} \beta = B_C * S_N \quad \text{[Formula 3]}$$

Here, the operator control variable β is a maximum channel bandwidth available in the base station, that is, a maximum bandwidth that may be used as a network slice service.

$$\text{System control variable:} \gamma = M_N * C_R (\text{where, } \gamma \propto S/N) \quad \text{[Formula 4]}$$

The system control variable γ is a constant value dynamically defined in the system according to the radio environment (S/N), and is determined as a highest performance value in the LOS environment.

Equation for a highest rate(peak data rate) that may be ensured by the radio subnetwork of the base station providing the virtual dedicated network slice:$\rho=(\alpha*\gamma)/T_G$[Mbit/S]     [Formula 5]

Second, the bandwidth $B_R$ for constructing the radio subnetwork by the base station providing the virtual dedicated network is based on [Formula 6] and may be dynamically controlled.

Radio slice bandwidth:$B_R\beta\gamma\log_2(1+S/N)$[Hz]     [Formula 6]

Figure 6:
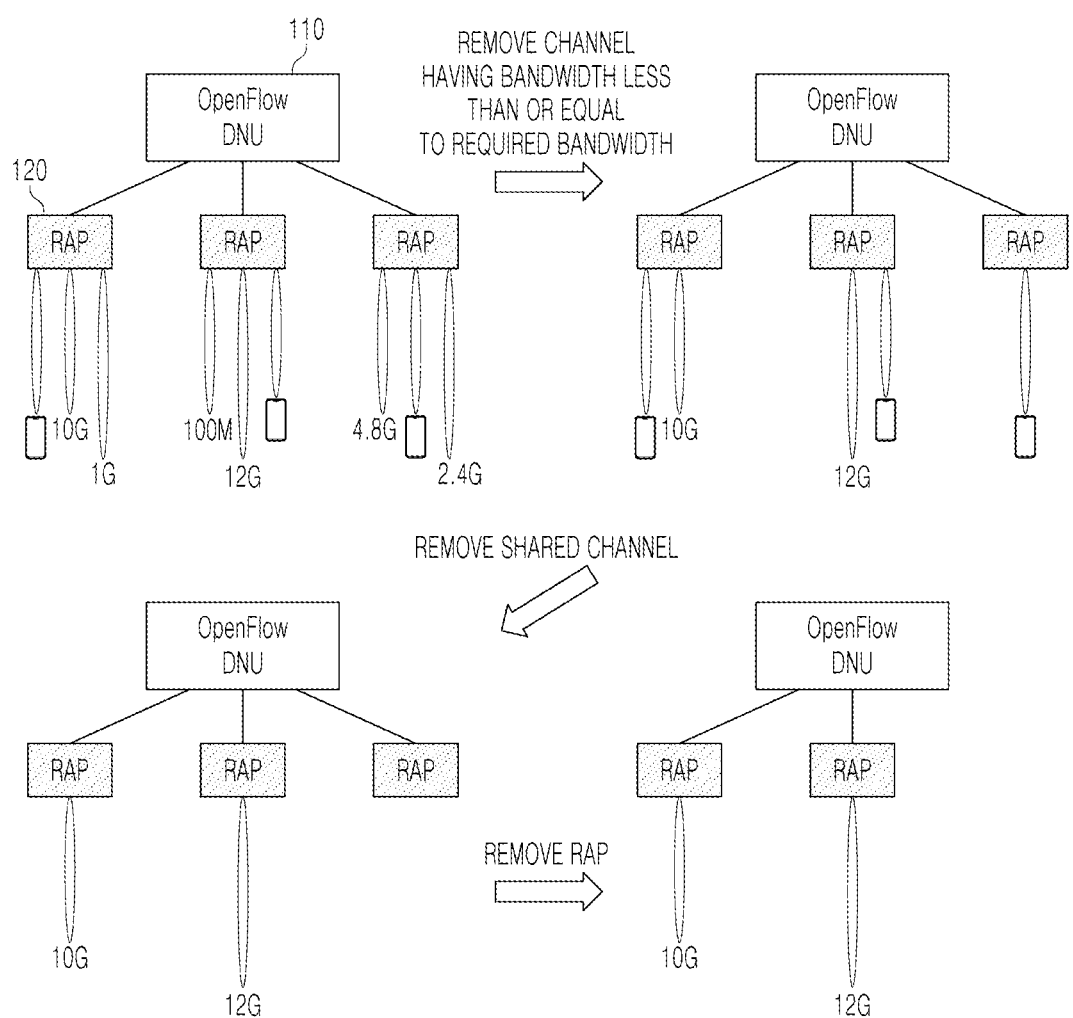
FIGS. 6 and 7 are illustrative diagrams for describing a radio subnetwork construction process according to an embodiment of the present invention.

In order to aid in understanding of the description, FIG. 6 illustrates a process of constructing the radio subnetwork.

Referring to FIG. 6, a physical network in the radio access network section may be expressed in the form of "R(A, C)" in which the open radio access point 120 of the base station 100 is named "A", and a radio link of the open radio access point 120 "A" is named "C".

A radio channel having a radio resource having a bandwidth less than or equal to the reference bandwidth required by the virtual dedicated network slice and a radio channel already occupied by another virtual dedicated network slice are excluded from "R(A, C)" for tree construction.

In this instance, the open radio access point 120 not having one or more available channels is unnecessary, and thus is excluded from the radio subnetwork.

In addition, it is necessary to reduce the temporal complexity for generating the dedicated network tree between the open radio access points 120 participating in the same virtual dedicated network slice, and the radio subnetwork therefor may be constructed in the form of "R'(A', C')".

Here, "A'" refers to an effective radio access point having one or more available channels, and "C'" refers to an available channel possessed by the effective radio access point.

In addition, the available channel mentioned here is a radio channel which has a bandwidth greater than or equal to the reference bandwidth required by the virtual dedicated network slice and is not occupied by another virtual dedicated network slice, and refers to a set of radio channels satisfying the above-mentioned [Formula 6] at the same time.

However, for example, when an open radio access point accessed by the UE cannot be included in "A'" at the time of construction of the virtual dedicated network slice that requires the reference bandwidth of 10G, it is fundamentally impossible to ensure the reference bandwidth for the UE, and thus it is desirable to immediately terminate construction of the virtual dedicated network slice and perform a procedure related to failure.

Meanwhile, in an actual physical network, the open radio access point 120 connected to the OpenFlow digital network unit 110 includes multiple channels having various bandwidths.

However, in order to improve the generation speed of the dedicated network tree, it is necessary to allocate and use only one channel satisfying the reference bandwidth in the open radio access points 120 connected to the OpenFlow digital network unit 110.

In this regard, the physical network topology including multiple channels may be abstracted into a single link to simplify the network topology, thereby improving the tree generation speed.

In this instance, a single channel is selected from the multiple channels such that only "R"(A', C")", which is a single channel having a minimum bandwidth, is left among multiple radio channels satisfying the above-mentioned [Formula 6] in the radio subnetwork "R'(A', C')".

Here, a single randomly selected radio channel is C" ⊂ C', and the property of C" satisfies the above-mentioned [Formula 6], and constantly has a minimum bandwidth Mill $B_R$∈C'.

When an approved new UE is put into an operating channel, the above-mentioned [Formula 5] needs to be satisfied. When [Formula 5] is not satisfied, a radio subnetwork construction procedure for ensuring an additional bandwidth needs to be performed again.

Figure 7:
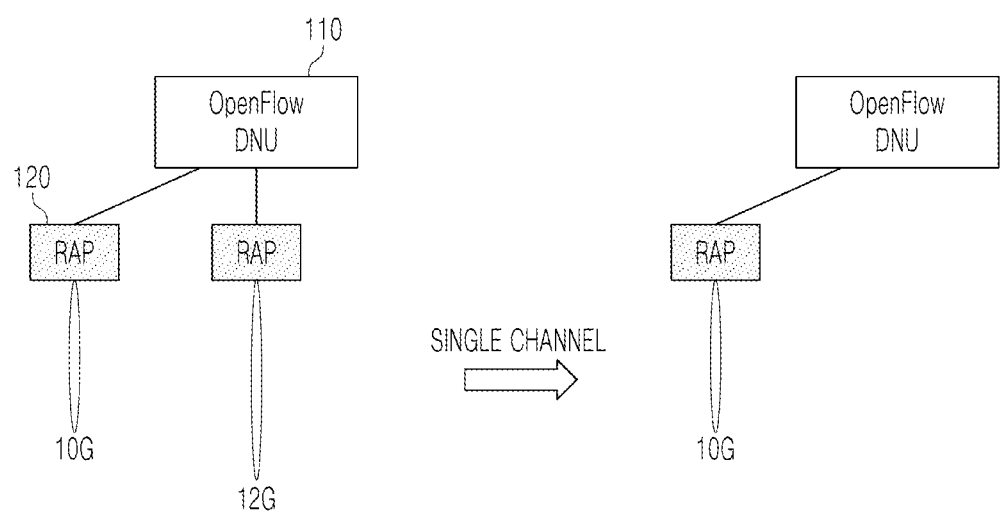

For reference, such a unification process of the multiple channels may be schematically illustrated in the form of, for example, FIG. 7.

Meanwhile, when construction of the virtual dedicated network slice is completed following generation of the dedicated network tree, which is a physical path through which packets may be forwarded in the virtual dedicated network slice, the generation unit 310 may report that information about the constructed virtual dedicated network slice may be forwarded and data may be transmitted between hosts participating in the virtual dedicated network slice.

On the other hand, when construction of the virtual dedicated network slice fails, the generation unit 310 may insert failure information into a virtual dedicated network slice generation queue and allow construction of the virtual dedicated network slice to be continued when a network resource becomes available in the future, which may be reported to a user and an administrator.

The determination unit 320 performs a function of determining an OpenFlow rule for packet forwarding.

Specifically, when a packet is generated between hosts belonging to the virtual dedicated network slice after construction of the virtual dedicated network slice is completed, the determination unit 320 determines an OpenFlow rule indicating a packet forwarding path based on the dedicated network tree, so that a packet may be forwarded according to the corresponding OpenFlow rule.

In this regard, when a packet is generated between hosts belonging to the virtual dedicated network slice, the determination unit 320 receives a packet-in message related to the corresponding packet, and compares virtual dedicated network slice identifiers of hosts corresponding to a source address and a destination address in the message.

In this instance, when the virtual dedicated network slice identifiers of the hosts are the same, the determination unit 320 may recognize a dedicated network tree matching the corresponding identifier, determine an OpenFlow rule according thereto, and install the determined OpenFlow rule in the OpenFlow digital network unit 110 of the base station 100 included in the dedicated network tree and the existing OpenFlow switch.

In this way, the OpenFlow digital network unit 110 of the base station 100 included in the dedicated network tree and the OpenFlow switches may forward packets between hosts according to the OpenFlow rule installed in this way.

Meanwhile, in relation thereto, according to the embodiment of the present invention, when a physical network is constructed in a private network and a public network, the physical network is recognized as one large virtual dedicated network slice as illustrated in FIG. 8(a). Furthermore, when the virtual dedicated network slice is constructed, an independent network corresponding thereto is formed as illustrated in FIG. 8(*b*), and communication between a host belonging to the corresponding network and a host belonging to another default virtual dedicated network slice is restricted.

In other words, it may be understood that only communication between hosts belonging to the same virtual dedicated network slice is allowed. Accordingly, for communication between hosts in an arbitrary virtual dedicated network slice, a packet transmission path is searched for in the corresponding virtual dedicated network slice rather than the entire network. Thus, it is possible to obtain an advantage of significantly reducing a time required for generation of an OpenFlow rule.

As described above, according to the configuration of the network control device 300 according to the embodiment of the present invention, it is possible to construct an end-to-end virtual dedicated network slice over the entire wired and wireless network section by applying the SDN-based OpenFlow technology, which may greatly contribute to expansion of spread of the private 5G networks. In addition, with the application of OpenFlow technology, complete isolation is enabled for each virtual dedicated network slice. In this way, it is possible to ensure security and ultra-low latency. Additionally, since network resources may be efficiently operated without adding resources, it is possible to achieve reduction in cost due to network operation.

Figure 9:
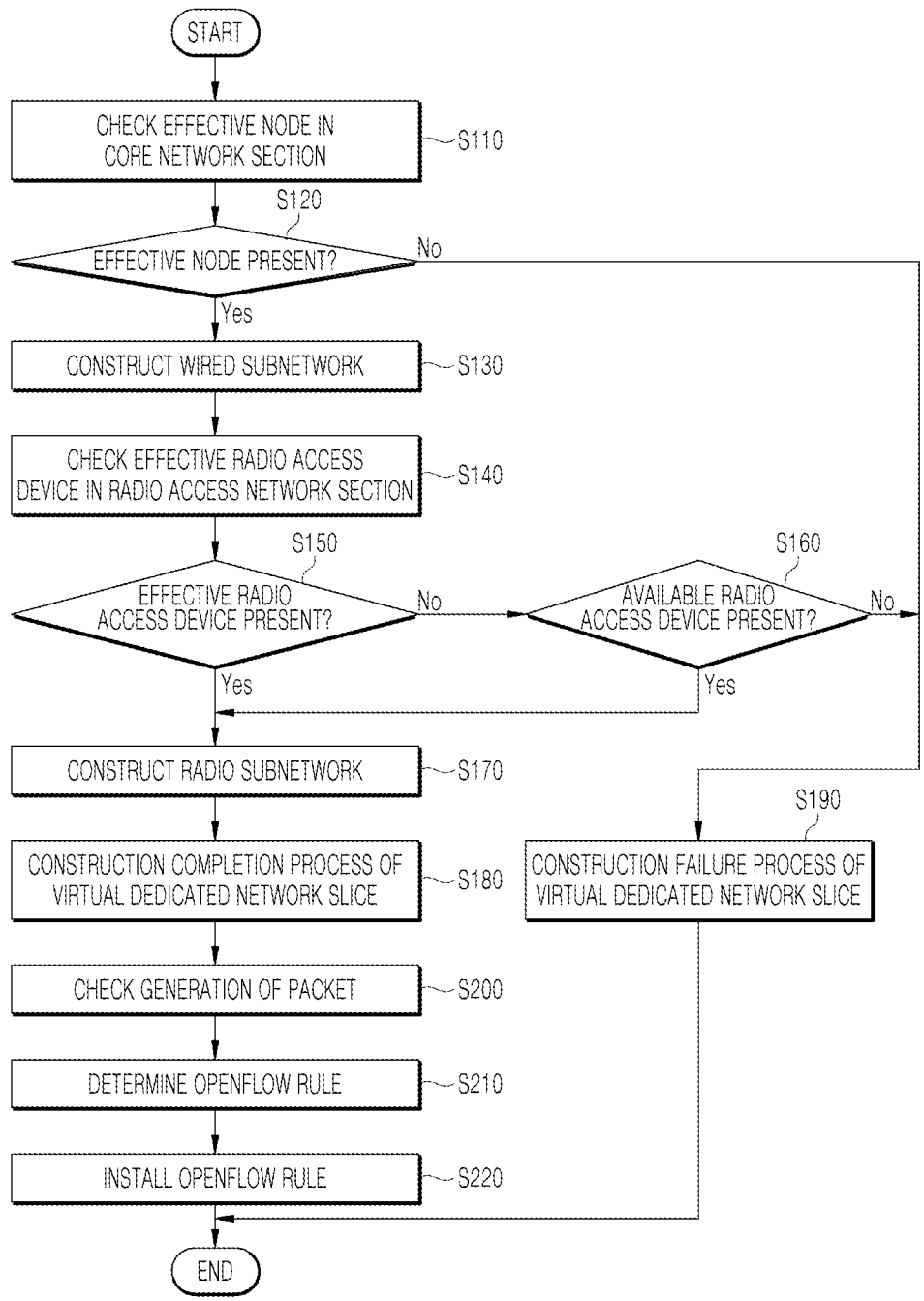
FIG. 9 is a flowchart for describing an operation method of the network control device according to an embodiment of the present invention.

Hereinafter, an operation method of the network control device 300 according to an embodiment of the present invention will be described with reference to FIG. 9.

First, when construction of the SDN-based virtual dedicated network slice is required, the generation unit 310 constructs a wired subnetwork for a core network section to generate a dedicated network tree, which is a physical path through which packets may be forwarded in the virtual dedicated network slice (S110 to S130).

In this instance, when there is an effective node having an available link, which is a wired link not occupied by another virtual dedicated network slice, having a bandwidth equal to or greater than a reference bandwidth required by the virtual dedicated network slice among nodes to which packets are forwarded in the core network section, the generation unit 310 may construct the wired subnetwork based on such an effective node and the available link of the effective node.

Here, the nodes reflected in the wired subnetwork construction may be understood as a host to which a destination address or a source address may be assigned in the core network section, the OpenFlow digital network unit 110 of the base station 100, and the existing OpenFlow switch.

In this regard, referring to FIG. 4 given as an example in the above description, a physical network in the core network section may be expressed in the form of "G(V, E)" in which a node to which the packet is forwarded is named "V", and a wired link of this node "V" is named "E".

A link having a resource having a bandwidth less than or equal to a reference bandwidth required by the virtual dedicated network slice and a link already occupied by another virtual dedicated network slice are excluded from "G(V, E)" for tree construction.

In this instance, an OpenFlow switch not having one or more available links is unnecessary, and thus is excluded from the wired subnetwork.

Meanwhile, since the host is not included in a packet transmission path between hosts, all the hosts and links between the hosts and the access OpenFlow switches are excluded from G(V, E).

However, by including access OpenFlow switches of hosts participating in the virtual dedicated network slice in the tree, packet transmission between the hosts participating in the virtual dedicated network slice is ensured as a result.

That is, a wired subnetwork for reducing the temporal complexity of generating the dedicated network tree may be constructed in the form of "G'(V', E')".

Here, "V'" refers to an effective node that is a node having one or more available links, and "E'" refers to an available link possessed by the effective node.

However, for example, when the access OpenFlow switch of the participating host cannot be included in "V'" at the time of construction of the virtual dedicated network slice that requires a reference bandwidth of 10G, it is fundamentally impossible to ensure the reference bandwidth for the host, and thus it is desirable to immediately terminate the construction of the virtual dedicated network slice and perform a procedure related to failure.

Meanwhile, in an actual physical network, a link between OpenFlow switches is configured as multiple links having various bandwidths.

However, in order to improve a generation speed of the dedicated network tree, it is necessary to allocate and use only one link that satisfies the reference bandwidth between arbitrary OpenFlow switches on the virtual dedicated network slice.

In this regard, the physical network topology including multiple links may be abstracted into a single link to simplify the network topology, thereby improving the tree generation speed.

In this instance, a single link is selected from the multiple links by leaving only one available link having the minimum bandwidth among remaining available links between arbitrary OpenFlow switches in the wired subnetwork "G'(V', E')", and by excluding remaining available links from the wired subnetwork.

For reference, a unification process of such multiple links may be schematically illustrated in the form illustrated in FIG. 5 given as an example in the above description.

Then, the generation unit 310 completes generation of the dedicated network tree such that, when a wired subnetwork for the core network section of the virtual dedicated network slice is constructed, a radio subnetwork for the radio access network section is subsequently constructed (S140 to S170).

Upon completing construction of the wired subnetwork, when there is an effective radio access device having an available channel, which is a radio channel not occupied by another virtual dedicated network slice, having a bandwidth greater than or equal to the reference bandwidth required by the virtual dedicated network slice among the open radio access points 120 in the radio access network section, the generation unit 310 may construct a radio service network based on such an effective radio access point and the available channel of the effective radio access point.

However, when there is no effective radio access device having an available channel, the generation unit 310 may construct the radio subnetwork based on an available radio access device, an occupied channel of which occupied by another virtual dedicated network slice has a residual bandwidth equal to or greater than the reference bandwidth, and the occupied channel of the available radio access device.

For example, when a link L having 40G is occupied by another virtual dedicated network slice referred to as A, which requires 10G, since there is a residual bandwidth of 30G, the corresponding link may be included in the radio subnetwork to generate a tree of a new virtual dedicated network slice that requires a bandwidth less than or equal to the bandwidth.

However, when a link is shared in this way, it is necessary to set a little guard band in order to avoid interference between virtual dedicated network slices.

Meanwhile, the bandwidth of the radio service network is equal to or greater than the reference bandwidth to construct the virtual dedicated network slice over the entire wired and wireless network section, and needs to be determined equal to or smaller than that of the wired subnetwork.

In this regard, referring to FIG. 6 given as an example in the above description, a physical network in the radio access network section may be expressed in the form of "R(A, C)" in which the open radio access point 120 of the base station 100 is named "A", and a radio link of the open radio access point 120 "A" is named "C".

A radio channel having a radio resource having a bandwidth less than or equal to the reference bandwidth required by the virtual dedicated network slice and a radio channel already occupied by another virtual dedicated network slice are excluded from "R(A, C)" for tree construction.

In this instance, the open radio access point 120 not having one or more available channels is unnecessary, and thus is excluded from the radio subnetwork.

In addition, it is necessary to reduce the temporal complexity for generating the dedicated network tree between the open radio access points 120 participating in the same virtual dedicated network slice, and the radio subnetwork therefor may be constructed in the form of "R'(A', C')".

Here, "A'" refers to an effective radio access point having one or more available channels, and "C'" refers to an available channel possessed by the effective radio access point.

In addition, the available channel mentioned here is a radio channel which has a bandwidth greater than or equal to the reference bandwidth required by the virtual dedicated network slice and is not occupied by another virtual dedicated network slice, and refers to a set of radio channels satisfying the above-mentioned [Formula 6] at the same time.

However, for example, when an open radio access point accessed by the UE cannot be included in "A'" at the time of construction of the virtual dedicated network slice that requires the reference bandwidth of 10G, it is fundamentally impossible to ensure the reference bandwidth for the UE, and thus it is desirable to immediately terminate construction of the virtual dedicated network slice and perform a procedure related to failure.

Meanwhile, in an actual physical network, the open radio access point 120 connected to the OpenFlow digital network unit 110 includes multiple channels having various bandwidths.

However, in order to improve the generation speed of the dedicated network tree, it is necessary to allocate and use only one channel satisfying the reference bandwidth in the open radio access points 120 connected to the OpenFlow digital network unit 110.

In this regard, the physical network topology including multiple channels may be abstracted into a single link to simplify the network topology, thereby improving the tree generation speed.

In this instance, a single channel is selected from the multiple channels such that only "R''(A', C'')", which is a single channel having a minimum bandwidth, is left among multiple radio channels satisfying the above-mentioned [Formula 6] in the radio subnetwork "R'(A', C')".

Here, a single randomly selected radio channel is $C'' \subset C'$, and the property of C'' satisfies the above-mentioned [Formula 6], and constantly has a minimum bandwidth min $B_R \in C'$.

When an approved new UE is put into an operating channel, the above-mentioned [Formula 5] needs to be satisfied. When [Formula 5] is not satisfied, a radio subnetwork construction procedure for ensuring an additional bandwidth needs to be performed again.

For reference, such a unification process of the multiple channels may be schematically illustrated in the form of, for example, FIG. 7.

Meanwhile, when construction of the virtual dedicated network slice is completed following generation of the dedicated network tree, which is a physical path through which packets may be forwarded in the virtual dedicated network slice, the generation unit 310 may report that information about the constructed virtual dedicated network slice may be forwarded and data may be transmitted between hosts participating in the virtual dedicated network slice (S180).

On the other hand, when construction of the virtual dedicated network slice fails, the generation unit 310 may insert failure information into a virtual dedicated network slice generation queue and allow construction of the virtual dedicated network slice to be continued when a network resource becomes available in the future, which may be reported to the user and the administrator (S190).

Thereafter, when a packet is generated between hosts belonging to the virtual dedicated network slice after construction of the virtual dedicated network slice is completed, the determination unit 320 determines an OpenFlow rule indicating a packet forwarding path based on the dedicated network tree, so that a packet may be forwarded according to the corresponding OpenFlow rule (S200 to S220).

In this regard, when a packet is generated between hosts belonging to the virtual dedicated network slice, the determination unit 320 receives a packet-in message related to the corresponding packet, and compares virtual dedicated network slice identifiers of hosts corresponding to a source address and a destination address in the message.

In this instance, when the virtual dedicated network slice identifiers of the hosts are the same, the determination unit 320 may recognize a dedicated network tree matching the corresponding identifier, determine an OpenFlow rule according thereto, and install the determined OpenFlow rule in the OpenFlow digital network unit 110 of the base station 100 included in the dedicated network tree and the existing OpenFlow switch.

In this way, the OpenFlow digital network unit 110 of the base station 100 included in the dedicated network tree and the OpenFlow switches may forward packets between hosts according to the OpenFlow rule installed in this way.

Meanwhile, in relation thereto, according to the embodiment of the present invention, when a physical network is constructed in a private network and a public network, the physical network is recognized as one large virtual dedicated network slice as illustrated in FIG. 8A given as an example in the above description. Furthermore, when the virtual dedicated network slice is constructed, an independent network corresponding thereto is formed as illustrated in FIG. 8B, and communication between a host belonging to the corresponding network and a host belonging to another default virtual dedicated network slice is restricted.

In other words, it may be understood that only communication between hosts belonging to the same virtual dedicated network slice is allowed. Accordingly, for communication between hosts in an arbitrary virtual dedicated network slice, a packet transmission path is searched for in the corresponding virtual dedicated network slice rather than the entire network. Thus, it is possible to obtain an advantage of significantly reducing a time required for generation of an OpenFlow rule.

As described above, according to the operation method of the network control device 300 according to the embodiment of the present invention, it is possible to construct an end-to-end virtual dedicated network slice over the entire wired and wireless network section by applying the SDN-based OpenFlow technology, which may greatly contribute to expansion of spread of the private 5G networks. In addition, with the application of OpenFlow technology, complete isolation is enabled for each virtual dedicated network slice. In this way, it is possible to ensure security and ultra-low latency. Additionally, since network resources may be efficiently operated without adding resources, it is possible to achieve reduction in cost due to network operation.

Meanwhile, functional operations and implementations of the subject matter described in this specification may be implemented as a digital electronic circuit, implemented as computer software, firmware, or hardware including the structures disclosed in this specification and structural equivalents thereof, or implemented as a combination of one or more thereof. The implementations of the subject matter described in this specification may be implemented as one or more computer programs, that is, one or more modules related to computer program instructions encoded on a tangible program storage medium for control of operation of a processing system or for execution thereof.

A computer-readable medium may be a machine-readable storage device, a machine-readable storage substrate, a memory device, a composition of substances that affect a machine-readable radio wave signal, or a combination of one or more thereof.

In this specification, the term "system" or "device" encompasses all apparatuses, devices, and machines for processing data, including, for example, programmable processors, computers, or multiple processors, or computers. A processing system may include, in addition to hardware, code that, upon request, forms an execution environment for a computer program, such as code constituting processor firmware, a protocol stack, a database management system, an operating system, or a combination of one or more thereof.

A computer program (also known as a program, software, software application, script, or code) may be written in any form of programming language, including compiled or interpreted language or priori or procedural language, and may be deployed in any form, including standalone programs or modules, components, subroutines or other units suitable for use in a computer environment. A computer program does not have to correspond to a file in a file system. A program may be stored in a single file provided to a requested program, in multiple interacting files (for example, files that store one or more modules, subprograms, or portions of code), or in portions of files that hold other programs or data (for example, one or more scripts stored within a markup language document). A computer program may be located at one site or deployed to be executed on a single computer or multiple computers distributed over a plurality of sites and interconnected by a communication network.

Meanwhile, computer-readable media suitable for storing computer program instructions and data may include, for example, semiconductor memory devices such as EPROM, EEPROM, and flash memory devices, for example, all types of nonvolatile memory, media, and memory devices, including magnetic disks such as internal hard disks or external disks, magneto-optical disks, and CD-ROM and DVD-ROM discs. A processor and memory may be supplemented by, or integrated into, a special purpose logic circuit.

Implementations of the subject matter described in this specification may be implemented in a computing system including, for example, backend components such as data servers, including, for example, middleware components such as application servers, or including, for example, a front-end component, such as a client computer having a web browser or graphical user interface, through which the user may interact with an implementation of the subject matter described in this specification, or any combination of one or more such back-end, middleware, or front-end component. The components of the system may be interconnected by any form or medium of digital data communication, such as, for example, a communication network.

This specification contains many specific implementation details, which are not to be construed as limitations on the scope of any invention or claim, and rather as descriptions of features that may be specific to particular embodiments of particular inventions. Likewise, certain features described in this specification in the context of separate embodiments may be implemented in combination in a single embodiment. Conversely, various features described in the context of a single embodiment may be implemented in a plurality of embodiments, either individually or in any suitable sub-combination. Further, even though features operate in a particular combination and may be initially depicted as claimed as such, one or more features from a claimed combination may be excluded from the combination in some cases, and the claimed combination may be modified as a subcombination or a variation of the subcombination.

In addition, even though operations are depicted in the drawings in a specific order in this specification, it is not to be understood that such operations need to be performed in the specific order or sequential order illustrated or that all illustrated operations need to be performed in order to achieve desirable results. In a certain case, multitasking and parallel processing may be advantageous. Further, separation of various system components of the above-described embodiments should not be construed as requiring such separation in all embodiments, and it should be understood that the program components and systems described may generally be integrated together into a single software product or packaged into multiple software products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A network control device comprising:
   a processor; and
   memory storing instructions thereon, the instructions when executed by the processor cause the processor to:
   generate a dedicated network tree, the dedicated network tree being a physical path through which a packet is allowed to be transmitted in a software-defined network (SDN)-based virtual dedicated network slice relative to a host belonging to the virtual dedicated network slice when generation of the virtual dedicated network slice is required, the dedicated network tree includes a wired subnetwork generated for a core network section of the virtual dedicated network slice and a radio subnetwork generated for a radio access network section of the virtual dedicated network slice; and determine an OpenFlow rule indicating a packet transmission path based on the dedicated network tree when a packet is generated between hosts belonging to the virtual dedicated network slice, and allow a packet to be transmitted according to the OpenFlow rule, wherein when an effective node having an available link is among nodes to which packets are transmitted in the core network section, the wired subnetwork is generated based on the effective node and the available link of the effective node, and wherein the available link is a wired link not occupied by another virtual dedicated network slice, having a bandwidth equal to or greater than a reference bandwidth required by the virtual dedicated network slice.

2. The network control device of claim 1, wherein the instructions further cause the processor to, when a number of available links of the effective node is two or more, exclude a remaining available link except for an available link having a minimum bandwidth among the two or more available links from the wired subnetwork.

3. The network control device of claim 2, wherein, the instructions further cause the processor to, when an effective radio access device having an available channel is among radio access points in the radio access network section, generate the radio service network based on the effective radio access point and the available channel of the effective radio access point, wherein the available channel is a radio channel not occupied by another virtual dedicated network slice, having a bandwidth greater than or equal to a reference bandwidth required by the virtual dedicated network slice.

4. The network control device of claim 3, wherein, the instructions further cause the processor to, when a number of available channels of the effective radio access point is two or more, exclude a remaining available channel except for an available channel having a minimum bandwidth among the two or more available channels from the radio subnetwork.

5. The network control device of claim 3, wherein, the instructions further cause the processor to, when the effective radio access device is not present, generate the radio subnetwork based on an available radio access device and an occupied channel of the available radio access device, wherein the available radio access device is has a residual bandwidth of the occupied channel occupied by the other virtual dedicated network slice equal to or greater than the reference bandwidth.

6. The network control device of claim 1, wherein:

the dedicated network tree includes a base station located at a boundary between a core network section and a radio access network section; and the base station includes an OpenFlow digital network unit serving as an OpenFlow switch dedicated to a radio access network in the core network section, and two or more open radio access points which are radio access points accessed by a terminal in the radio access network section and connected to the OpenFlow digital network unit by Ethernet protocol.

7. An operation method of a network control device, the operation method comprising:

generating a dedicated network tree, the dedicated network tree being a physical path through which a packet is allowed to be transmitted in an SDN-based virtual dedicated network slice relative to a host belonging to the virtual dedicated network slice when construction of the virtual dedicated network slice is required, the dedicated network tree including a wired subnetwork generated for a core network section of the virtual dedicated network slice and a radio subnetwork generated for a radio access network section of the virtual dedicated network slice; and determining an OpenFlow rule indicating a packet transmission path based on the dedicated network tree when a packet is generated between hosts belonging to the virtual dedicated network slice, and allowing a packet to be transmitted according to the OpenFlow rule, wherein when an effective node having an available link is among nodes to which packets are transmitted in the core network section, the wired subnetwork is generated based on the effective node and the available link of the effective node, and wherein the available link is a wired link not occupied by another virtual dedicated network slice, having a bandwidth equal to or greater than a reference bandwidth required by the virtual dedicated network slice.

8. The operation method of claim 7, wherein, when an effective radio access device having an available channel is among radio access points in the radio access network section, generating the radio service network based on the effective radio access point and the available channel of the effective radio access point, wherein the available channel is a radio channel not occupied by another virtual dedicated network slice, having a bandwidth greater than or equal to a reference bandwidth required by the virtual dedicated network slice.

* * * * *